US011599902B2

United States Patent
Goldstein et al.

(10) Patent No.: US 11,599,902 B2
(45) Date of Patent: Mar. 7, 2023

(54) INTERACTIVE ADVERTISEMENT DRIVING TRANSACTION OF AN ADVERTISED DIGITAL CONTENT DISPLAYED DURING ONLINE PLAYING OF A CONTENT

(71) Applicant: CRACKLE, INC., Culver City, CA (US)

(72) Inventors: Aaron Goldstein, Culver City, CA (US); Christine Coner, Culver City, CA (US); Ihor Yaskiw, Culver City, CA (US)

(73) Assignee: Crackle, Inc., Culver City, CA (US)

( * ) Notice: Subject to any disclaimer, the term of this patent is extended or adjusted under 35 U.S.C. 154(b) by 347 days.

(21) Appl. No.: 15/457,811

(22) Filed: Mar. 13, 2017

(65) Prior Publication Data
US 2018/0260844 A1    Sep. 13, 2018

(51) Int. Cl.
G06Q 30/00    (2012.01)
G06Q 30/0251    (2023.01)
H04L 67/306    (2022.01)

(52) U.S. Cl.
CPC ....... G06Q 30/0253 (2013.01); H04L 67/306 (2013.01)

(58) Field of Classification Search
CPC ..... G06Q 30/00; G06Q 30/0207–0277; G06Q 20/12–127
See application file for complete search history.

(56) References Cited

U.S. PATENT DOCUMENTS 6,668,377 B1 * 12/2003 Dunn ................. H04N 7/17318
                                                              348/E7.071
8,307,392 B2    11/2012 Ahanger et al.
(Continued)

FOREIGN PATENT DOCUMENTS

CN    103475909 A    12/2013
CN    103581706 A    2/2014
(Continued)

OTHER PUBLICATIONS

Information on Crackle, 2015, archived web pages of www.crackle.com printed through www.archive.org, date is in the URL in YYYYMMDD format (Year: 2015).*
(Continued)

*Primary Examiner* — Naresh Vig
(74) *Attorney, Agent, or Firm* — Procopio, Cory, Hargreaves & Savitch LLP (57) ABSTRACT

Delivering and presenting content including an interactive advertisement to a user, including: transmitting the content including the interactive advertisement to an entertainment device through an application, wherein the application is registered under a user account with an app store; playing the interactive advertisement including call-to-action icons to request the user to initiate a transaction for purchasing an item of second content; determining whether the user is requesting an immediate or later purchase; charging for the purchased item of second content to the user account and initiating a background download of the purchased item of second content, when it is determined that the user is requesting the immediate purchase; adding the item of content to the user account, when it is determined that the user is requesting the later purchase; and resuming the transmission of the content.

19 Claims, 5 Drawing Sheets

(56) References Cited

U.S. PATENT DOCUMENTS

| | | | |
|---|---|---|---|
| 2008/0040758 A1* | 2/2008 | Beetcher | H04N 5/44543 725/81 |
| 2008/0281689 A1* | 11/2008 | Blinnikka | G06Q 30/02 705/14.61 |
| 2008/0319852 A1* | 12/2008 | Gardner | G06Q 30/02 705/14.4 |
| 2009/0099911 A1* | 4/2009 | Ota | G06Q 30/0269 705/14.66 |
| 2009/0198580 A1* | 8/2009 | Broberg | G06Q 30/0207 705/14.1 |
| 2010/0084810 A1 | 4/2010 | Cheng et al. | |
| 2011/0125610 A1* | 5/2011 | Goodsall | G06Q 20/12 705/27.1 |
| 2011/0162002 A1* | 6/2011 | Jones | G06Q 30/0241 725/32 |
| 2012/0010944 A1* | 1/2012 | Bach | G06Q 30/0246 705/14.45 |
| 2012/0316965 A1* | 12/2012 | Mathews | G06Q 30/0269 705/14.61 |
| 2014/0123175 A1 | 5/2014 | Cormie et al. | |
| 2017/0310814 A1* | 10/2017 | Knight | H04W 12/0802 |

FOREIGN PATENT DOCUMENTS

| | | |
|---|---|---|
| CN | 104754412 A | 7/2015 |
| CN | 105208415 A | 12/2015 |
| CN | 105260201 A | 1/2016 |

OTHER PUBLICATIONS

Robin Meyer, What is iTunes? The 56 Things Apple's Behemoth Does, Sep. 19, 2013, The Atlantic Money Group (Year: 2013).*

"How do video streaming services like Netflix remember where you are in the video when you exit browser or when the app exits unexpectedly?", 2017, www.Quora.com (Year: 2017).*

Bulunder et al. "Comparison of different approaches for mobile advertising", 2005, IEEE (Year: 2005).*

* cited by examiner

INTERACTIVE ADVERTISEMENT DRIVING TRANSACTION OF AN ADVERTISED DIGITAL CONTENT DISPLAYED DURING ONLINE PLAYING OF A CONTENT

BACKGROUND

Field of the Disclosure

The present disclosure relates to interactive advertisement, and more specifically, to interactive advertisement driving transactions on an electronic store.

Background

Content may be consumed by a user using many different hardware platforms and in many different formats. Also, the content may be delivered to the user using many different delivery mechanisms. The content may include advertisements, which can be placed before (i.e., pre-roll), after (i.e., post-roll) or in the middle (i.e., mid-roll) of the content. Further, the advertisements may be interactive advertisements.

In most cases, a good interactive advertisement needs to be non-disruptive to the consumption of the content itself. However, creating a non-disruptive but good interactive advertisement is a challenge, especially for pre-roll or mid-roll advertisements.

SUMMARY

The present disclosure provides for delivering and presenting content including an interactive advertisement to a user.

In one implementation, a method for delivering and presenting content including an interactive advertisement to a user is disclosed. The method includes: transmitting the content including the interactive advertisement to an entertainment device through an application, wherein the application is registered under a user account with an app store; playing the interactive advertisement including call-to-action icons to request the user to initiate a transaction for purchasing an item of second content; determining whether the user is requesting an immediate or later purchase; charging for the purchased item of second content to the user account and initiating a background download of the purchased item of second content, when it is determined that the user is requesting the immediate purchase; adding the item of content to the user account, when it is determined that the user is requesting the later purchase; and resuming the transmission of the content.

In another implementation, a system is disclosed. The system includes: an entertainment device configured to download and play content for viewing by a user; an online content distributor configured to deliver and present the content including an interactive advertisement to the entertainment device through an application, wherein the user obtains the application through the app store and installs the application on the entertainment device, wherein the application is registered under a user account with the app store such that an item of second content can be purchased and downloaded in a background mode while the content is presented to the user in a foreground mode.

In a further implementation, an apparatus for delivering and presenting content including an interactive advertisement to a user is disclosed. The apparatus includes: means for transmitting the content including the interactive advertisement through an application, wherein the application is registered under a user account with an app store; means for playing the interactive advertisement including call-to-action icons to request the user to initiate a transaction for purchasing an item of second content; means for determining whether the user is requesting an immediate or later purchase; means for charging for the purchased item of second content to the user account and initiating a background download of the purchased item of second content, when it is determined that the user is requesting the immediate purchase; means for adding the item of content to the user account, when it is determined that the user is requesting the later purchase; and means for resuming the transmission of the content.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, creating a non-disruptive but good interactive advertisement is a challenge, especially for pre-roll or mid-roll advertisements. Conventional solutions may allow clicking on the item(s) within the content display to select and store the item for later transaction. Thus, once the consumption of the content is finished, the user may recall and process the stored transaction. However, processing the stored transaction is not simple and may frustrate the user enough to abandon the transaction.

Certain implementations of the present disclosure provide alternative solutions for delivering and presenting the interactive advertisement in such a way as to take advantage of the connection/interaction between the entertainment console or device on which the user is consuming the content and the application store to which the entertainment console or device is registered and connected. After reading these descriptions, it will become apparent how to implement the disclosure in various implementations and applications.

However, although various implementations of the present disclosure will be described herein, it is understood that these implementations are presented by way of example only, and not limitation. As such, this detailed description of various implementations should not be construed to limit the scope or breadth of the present disclosure.

Figure 1:
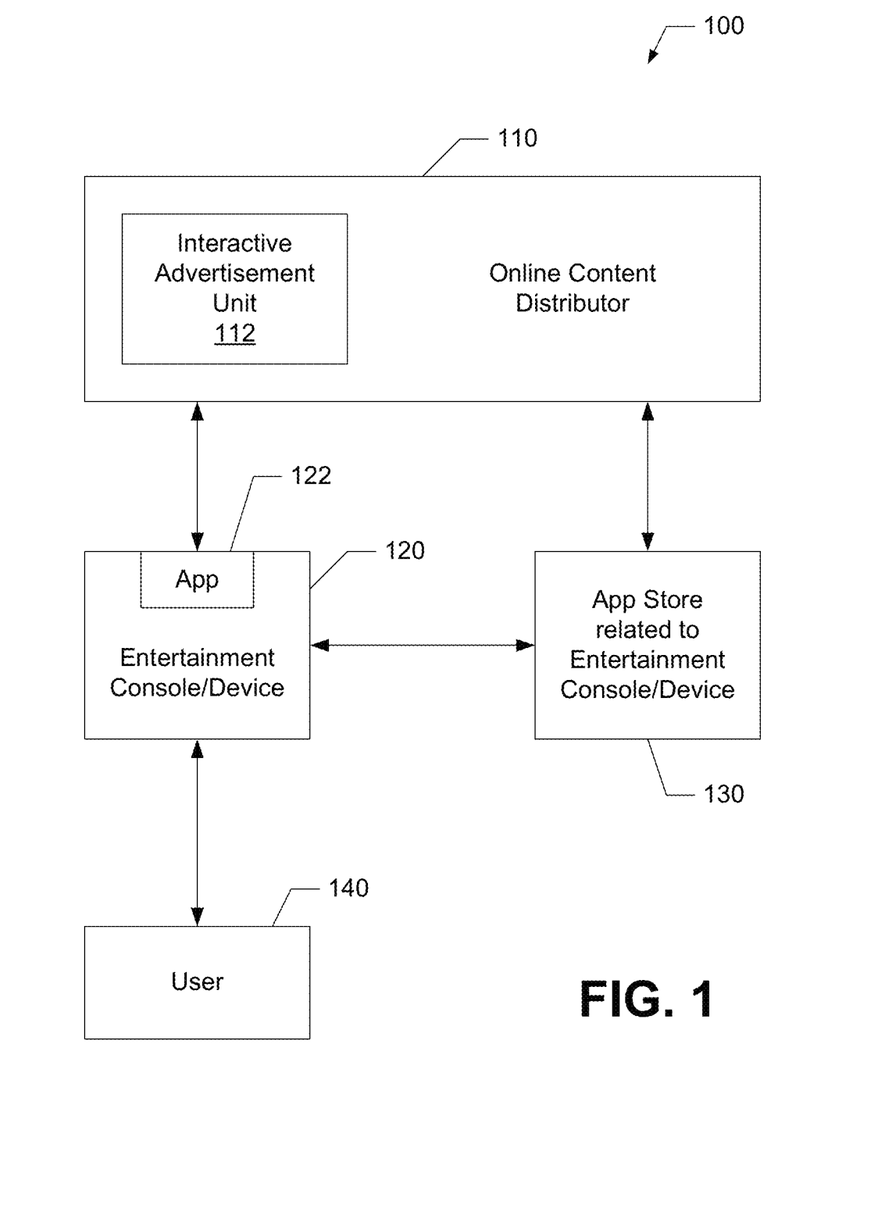
FIG. 1 is a block diagram of an entertainment system in accordance with one implementation of the present disclosure.

FIG. 1 is a block diagram of an entertainment system 100 in accordance with one implementation of the present disclosure. In the illustrated implementation of FIG. 1, the system 100 includes an online content distributor 110, an entertainment console or device 120, and an app store 130 to which the entertainment console or device 120 is registered and connected. In one implementation, the online content distributor 110 includes an interactive advertisement unit 112. In one implementation, the entertainment console or device 120 includes a game console such as PlayStation®. In another implementation, the entertainment console or device 120 includes a mobile device such as a smartphone.

In one implementation of the entertainment system 100, a user 140 is consuming the content being played on the entertainment console or device 120. The user 140 installs an application 122 on the entertainment console or device 120, which allows the user 140 to consume the content streamed or downloaded from the online content distributor 110. In one implementation, the content is a movie, TV show, or sporting event. In another implementation, the content is a game.

The application 122 is supplied by the online content distributor 110 through the app store 130. Since the application 122 is obtained through the app store 130, there is a connection between the application 122 and the app store 130, wherein the application 122 will be able to transact with the app store 130 regarding a registered account of the user 140 at the app store 130.

Figure 2:
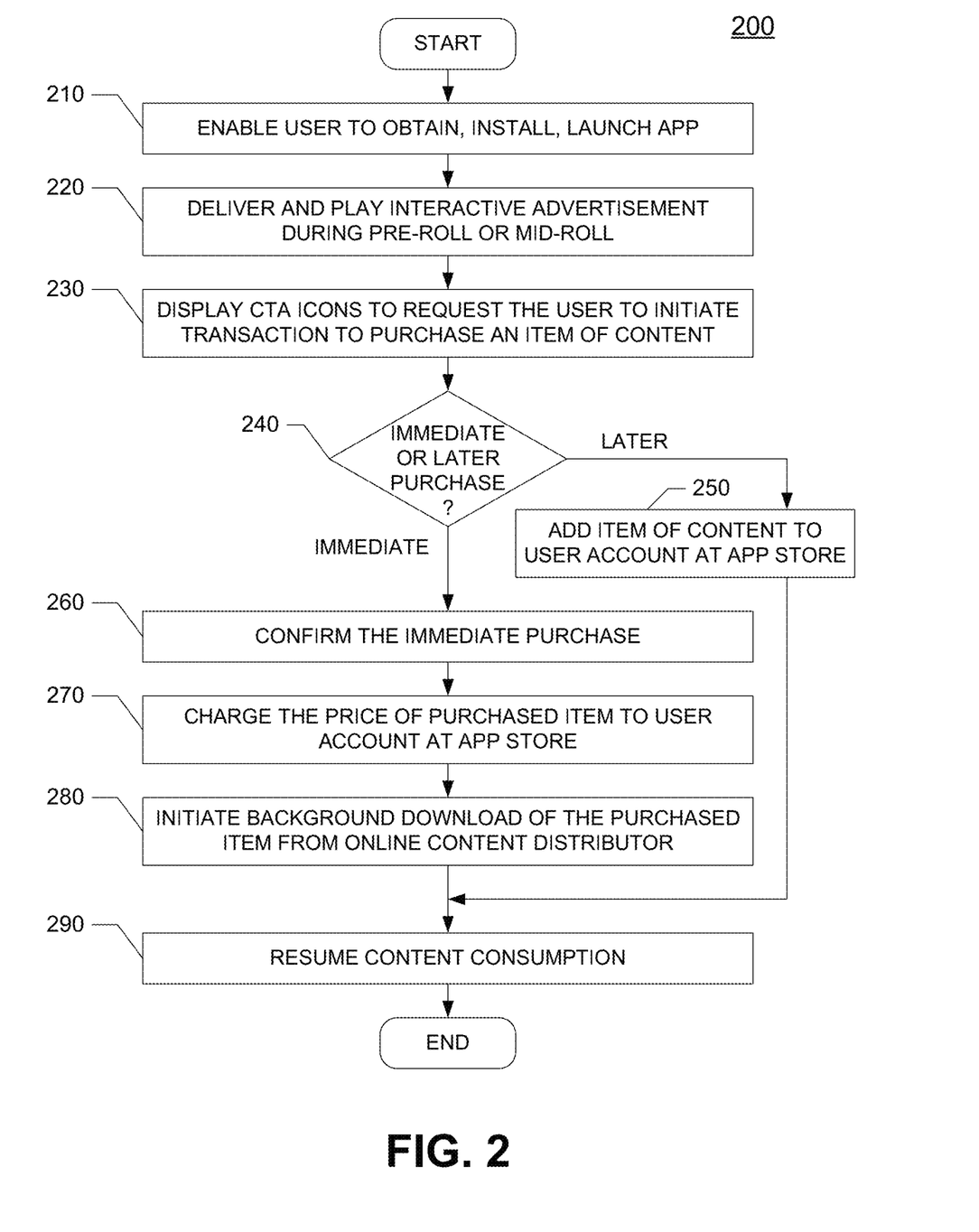
FIG. 2 is a flow diagram illustrating a process for the interactive advertisement unit to deliver and present the interactive advertisement to the user in accordance with one implementation of the present disclosure.

FIG. 2 is a flow diagram 200 illustrating a process for the interactive advertisement unit 112 to deliver and present the interactive advertisement to the user 140 in accordance with one implementation of the present disclosure. In this implementation, the interactive advertisement is delivered and presented in such a way as to take advantage of the connection between the application 122 on the entertainment console or device 120 and the app store 130.

Figure 3:
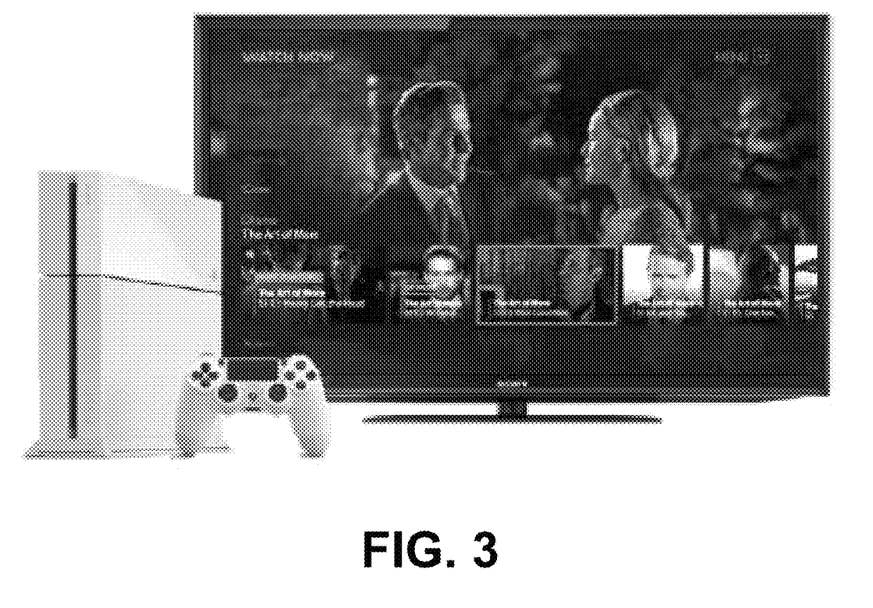
FIG. 3 shows one example of the content being played on the entertainment console or device.

In the illustrated implementation of FIG. 2, the online content distributor 110 enables the user 140, at block 210, to obtain and install (on the entertainment console or device 120) the application 122 through the app store 130. The user 140 launches the application 122 installed on the entertainment console or device 120 and consumes the content. FIG. 3 shows one example of the content being played on the entertainment console or device 120.

Figure 4:
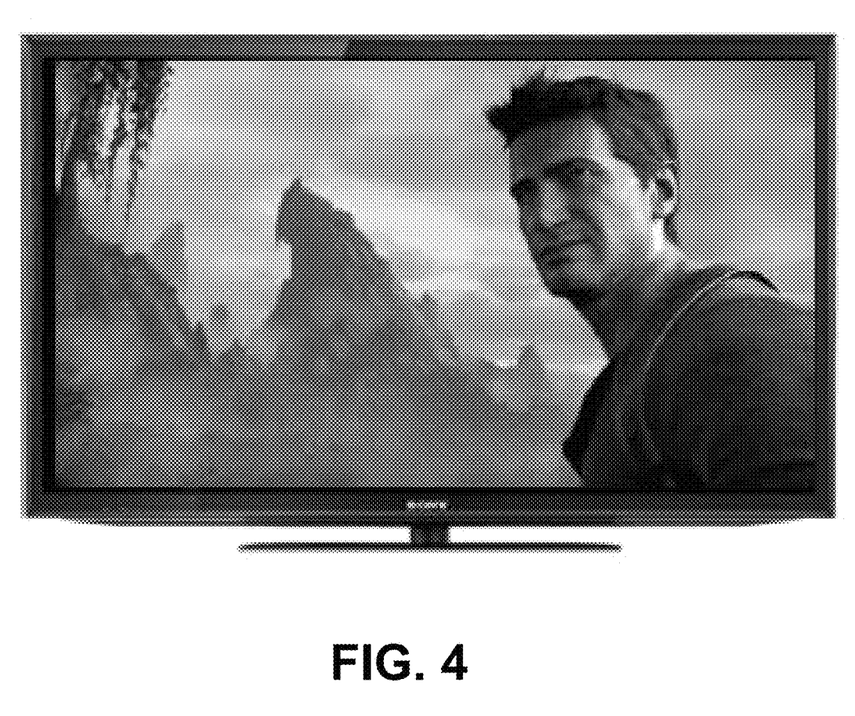
FIG. 4 shows one example of the delivered interactive advertisement being played on the entertainment console or device.

During the pre-roll or mid-roll of the content, at block 220, an interactive advertisement (advertising, for example, an item of content) delivered by the interactive advertisement unit 112 is played on the entertainment console or device 120. FIG. 4 shows one example of the delivered interactive advertisement being played on the entertainment console or device 120.

Figure 5:
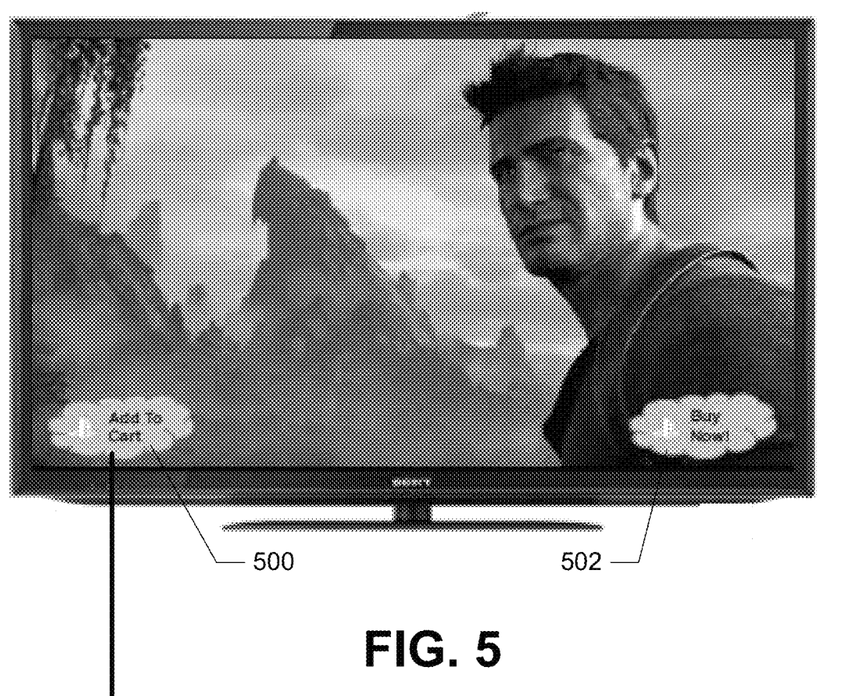
FIG. 5 shows one example of the CTA icons being displayed while the interactive advertisement is playing.

Call-to-action (CTA) icons are displayed, at block 230, to request the user to initiate a transaction for purchasing and obtaining the item. In one implementations, the CTA icons are clickable icons. In another implementation, the CTA icons are created as visible but unobstructive icons such as transparent icons overlaid on top of the interactive advertisement. In yet another implementation, the CTA icons are created as other display items such as dialog boxes. FIG. 5 shows one example of the CTA icons 500, 502 being displayed while the interactive advertisement is playing.

In one implementation, the item of content to be obtained is a movie, TV show, or sporting event. In another implementation, the content is a game. In other implementations, the CTA icons provide selections other than just the options to purchase now or later. For example, the CTA icons may provide additional selections such as options to decline the purchase or view other interactive advertisements.

Figure 6:
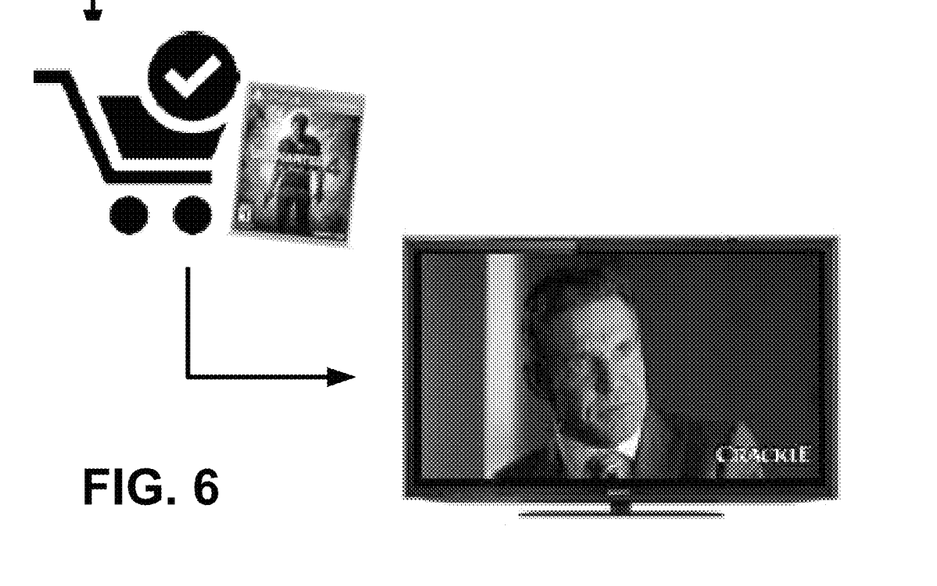
FIG. 6 shows one example of the later purchase, which results in the item of content being added to the registered account of the user, and the content consumption resumes.

A determination is then made, at block 240, whether the transaction is for the immediate purchase of the item or for adding the item to a cart for later purchase. If it is determined, at block 240, that the transaction is for the later purchase, the item of content is automatically added to the registered account of the user 140 at the app store 130, at block 250. FIG. 6 shows one example of the later purchase, which results in the item of content being added to the registered account of the user 140 (e.g., the item being added to the cart), and the content consumption resumes.

Figure 7:
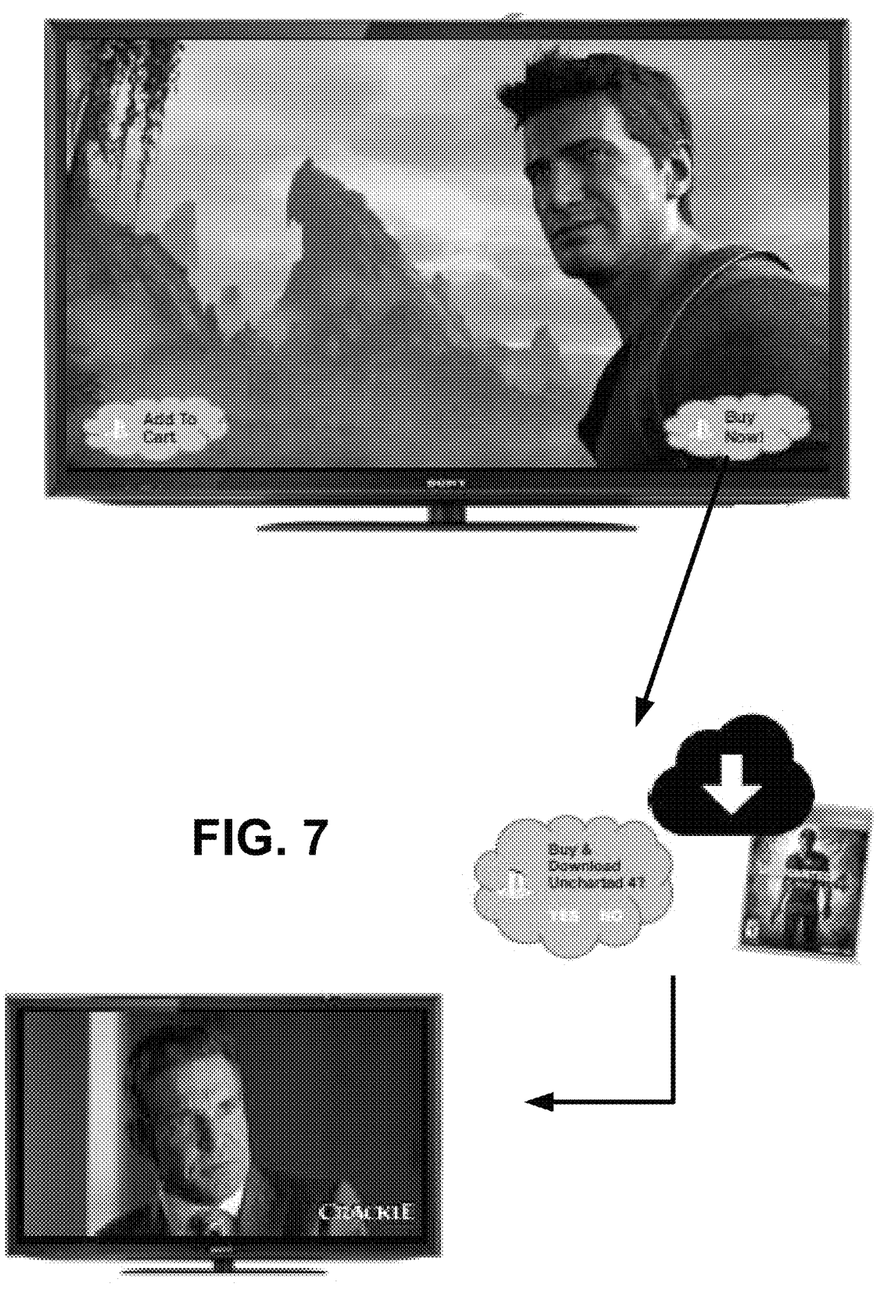
FIG. 7 shows one example of the immediate purchase, which results in the item of content being downloaded in the background, and the content consumption resumes in the foreground.

However, if it is determined, at block 240, that the transaction is for the immediate purchase, the user 140 is requested to confirm the immediate purchase, at block 260. Once the confirmation is received from the user 140, the price of the purchased item is charged, at block 270, to the registered account of the user 140 at the app store 130. The background download of the item from the online content distributor 110 is then initiated, at block 280. Once the transaction is finished, the consumption of the content on the entertainment console or device 120 is resumed, at block 290, while the background download of the item of second content is running. FIG. 7 shows one example of the immediate purchase, which results in the item of content being downloaded in the background, and the content consumption resumes in the foreground.

Additional variations and implementations are also possible. For example, the item of content can be data for various types of content or other data, such as movies, television, video, music, audio, games, scientific data, medical data, etc. Accordingly, the specific examples discussed herein are not the only implementations within the scope of the new technology.

One implementation includes one or more programmable processors and corresponding computer system components to store and execute computer instructions, such as to deliver and present the interactive advertisement to the user in such a way as to take advantage of the connection between the application and the app store.

The above description of the disclosed implementations is provided to enable any person skilled in the art to make or use the disclosure. Various modifications to these implementations will be readily apparent to those skilled in the art, and the generic principles described herein can be applied to other implementations without departing from the spirit or scope of the disclosure. Accordingly, the techniques are not limited to the specific examples described above. Thus, it is to be understood that the description and drawings presented herein represent a presently possible implementation of the disclosure and are therefore representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for delivering and presenting first content including an interactive advertisement to an entertainment device, the method comprising:
   transmitting the first content including the interactive advertisement from an online content distributor to the entertainment device through an application, wherein the application is already installed on the entertainment device and is registered under a user account with an app store;
   playing the interactive advertisement, at the entertainment device, during the transmission and presentation of the first content;
   displaying call-to-action icons of the application during the playing of the interactive advertisement to request the user to initiate a transaction for purchasing an item of second content;
   purchasing the item of the second content using the call-to-action icons of the application during the transmission and the presentation of the first content, wherein purchasing the item of the second content using the call-to-action icons of the application is made easier by taking advantage of a connection between the application, which is already installed on the entertainment device, and the app store in which the application is registered under the user account;
   determining, by the online content distributor, whether the user is requesting an immediate or later purchase of the item of second content;
   charging, by the online content distributor, for the purchased item of second content to the user account registered in the app store and through the application, when it is determined that the user is requesting the immediate purchase;
   initiating, by the entertainment device, a background download of the purchased item of second content and playing the first content during the background download of the purchased item of second content, when it is determined that the user is requesting the immediate purchase;
   adding, by the online content distributor, the item of second content to the user account, when it is determined that the user is requesting the later purchase; and
   resuming the presentation of the first content.

2. The method of claim 1, further comprising
   enabling the user to obtain and install the application on the entertainment device through the app store.

3. The method of claim 1, wherein playing the interactive advertisement is done during a mid-roll of the first content.

4. The method of claim 1, wherein the call-to-action icons are clickable icons.

5. The method of claim 1, wherein the call-to-action icons are transparent icons overlaid on top of the interactive advertisement.

6. The method of claim 1, wherein the call-to-action icons are dialog boxes.

7. The method of claim 1, wherein the item of second content comprises one of a movie, TV show, sporting event, or game.

8. The method of claim 1, wherein playing the interactive advertisement is done during a pre-roll of the first content.

9. The method of claim 1, further comprising
   requesting a confirmation from the user for the immediate purchase before charging for the purchased item of second content.

10. A system comprising:
    an entertainment device to download and play first content for viewing by a user;
    an app store coupled to the entertainment device; and
    an online content distributor to deliver and present the first content including an interactive advertisement to the entertainment device through an application,
    wherein the application is already installed on the entertainment device and is registered under a user account with the app store such that an item of second content can be purchased and downloaded in a background mode while the content is presented to the user in a foreground mode,
    wherein the user obtains the application through the app store and installs the application on the entertainment device;
    the entertainment device to play the interactive advertisement during the transmission and presentation of the first content by:
       displaying call-to-action icons of the application during the playing of the interactive advertisement to request the user to initiate a transaction for purchasing an item of second content;
       purchasing the item of the second content using the call-to-action icons of the application during the transmission and the presentation of the first content, wherein purchasing the item of the second content using the call-to-action icons of the application is made easier by taking advantage of a connection between the application, which is already installed on the entertainment device, and the app store in which the application is registered under the user account;
    the online content distributor to:
       determine whether the user is requesting an immediate or later purchase of the item of the second content;
       charge for the purchased item of the second content to the user account registered in the app store and through the application, when it is determined that the user is requesting the immediate purchase;
       add the item of the second content to the user account, when it is determined that the user is requesting the later purchase;
    the entertainment device to initiate a background download of the purchased item of the second content and playing the first content during the background download of the purchased item of the second content, when it is determined that the user is requesting the immediate purchase, and to resume the presentation of the first content.

11. The system of claim 10, further comprising
    the entertainment device to enable the user to obtain and install the application on the entertainment device through the app store.

12. The system of claim 10, wherein the entertainment device comprises a mobile device.

13. The system of claim 10, wherein the item of second content comprises one of a movie, TV show, sporting event, or game.

14. The system of claim 10, wherein the online content distributor comprises an interactive advertisement unit to deliver and present the interactive advertisement on the entertainment device.

15. The system of claim 10, wherein the call-to-action icons are transparent icons overlaid on top of the interactive advertisement.

16. The system of claim 10, wherein the call-to-action icons are dialog boxes.

17. The system of claim 10, wherein the interactive advertisement is played during a mid-roll of the first content.

18. The system of claim 10, wherein the interactive advertisement is played during a pre-roll of the first content.

19. The system of claim 10, wherein a confirmation is requested from the user by the online content distributor for the immediate purchase before charging for the purchased item of second content.

* * * * *